US008370846B2

(12) United States Patent
Hayashi (10) Patent No.: US 8,370,846 B2
(45) Date of Patent: Feb. 5, 2013

(54) TASK EXECUTION DEVICE AND METHOD

(75) Inventor: Kunihiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 1740 days.

(21) Appl. No.: 11/464,864

(22) Filed: Aug. 16, 2006

(65) Prior Publication Data

US 2007/0050779 A1    Mar. 1, 2007

(30) Foreign Application Priority Data

Aug. 24, 2005   (JP) .................................. 2005-243417

(51) Int. Cl.
*G06F 9/46* (2006.01)

(52) U.S. Cl. ........ 718/108; 718/100; 718/102; 718/103; 718/107

(58) Field of Classification Search .................. 718/108, 718/100, 101, 102, 104, 107, 103
See application file for complete search history.

(56) References Cited

U.S. PATENT DOCUMENTS

| 5,628,013 | A * | 5/1997 | Anderson et al. ............. 718/107 |
| 6,430,594 | B1 * | 8/2002 | Akiyama et al. ............. 718/108 |
| 6,684,342 | B1 | 1/2004 | Kelsey et al. |
| 6,834,386 | B1 * | 12/2004 | Douceur et al. ............. 718/107 |
| 7,010,612 | B1 | 3/2006 | Si et al. |
| 7,047,396 | B1 | 5/2006 | Fotland et al. |
| 7,082,519 | B2 | 7/2006 | Kelsey et al. |
| 7,120,783 | B2 | 10/2006 | Fotland et al. |
| 7,207,045 | B2 * | 4/2007 | Goiffon ........................ 718/107 |
| 7,308,686 | B1 | 12/2007 | Fotland et al. |
| 7,322,033 | B2 | 1/2008 | Ito |
| 7,546,442 | B1 | 6/2009 | Fotland et al. |
| 7,735,087 | B2 | 6/2010 | Hayashi |
| 2002/0002667 | A1 | 1/2002 | Kelsey et al. |
| 2002/0038416 | A1 | 3/2002 | Fotland et al. |

(Continued)

FOREIGN PATENT DOCUMENTS

JP    7-295694    11/1995
JP    8-305416    11/1996

(Continued)

OTHER PUBLICATIONS

Japanese Office Action (Notice of Allowance) dated on Aug. 17, 2010.

(Continued)

*Primary Examiner* — Emerson Puente
*Assistant Examiner* — Willy W Huaracha
(74) *Attorney, Agent, or Firm* — Greenblum & Bernstein, P.L.C.

(57) ABSTRACT

A task execution method for executing a plurality of tasks while switching the tasks from one to another by time-sharing, wherein an allocated time is allocated for each of the plurality of tasks, and the plurality of tasks includes a plurality of first-type tasks and a single second-type task, and the task execution method includes a task selection step which selects a task from among the plurality of tasks according to a predetermined sequence, a correction step which corrects an allocated time for the second-type task so that execution of the plurality of tasks completes within the cycle time, when the task selected is a second-type task, which is the total allocated time for the plurality of tasks, and a task execution control step which causes the selected task to be executed so that the execution of the selected task completes within the allocated time or the corrected allocated time.

20 Claims, 6 Drawing Sheets

U.S. PATENT DOCUMENTS

| | | | |
|---|---|---|---|
| 2003/0037091 A1* | 2/2003 | Nishimura et al. | 709/103 |
| 2003/0037228 A1 | 2/2003 | Kelsey et al. | |
| 2003/0187907 A1* | 10/2003 | Ito | 709/102 |
| 2004/0064817 A1* | 4/2004 | Shibayama et al. | 718/104 |
| 2004/0181791 A1* | 9/2004 | Hayashi | 718/100 |
| 2009/0019445 A1* | 1/2009 | Oswald | 718/104 |
| 2009/0282407 A1 | 11/2009 | Hayashi | |

FOREIGN PATENT DOCUMENTS

| | | |
|---|---|---|
| JP | 2000-56989 | 2/2000 |
| JP | 2000-122883 | 4/2000 |
| JP | 2003-298599 | 10/2003 |
| JP | 2003-337713 | 11/2003 |
| JP | 2004-280297 | 10/2004 |
| JP | 2005-018560 | 1/2006 |

OTHER PUBLICATIONS

English Language Abstract of JP 2005-018560.
English Language Abstract of JP 2004-280297.

* cited by examiner

TASK EXECUTION DEVICE AND METHOD

BACKGROUND OF THE INVENTION (1) Field of the Invention

The present invention relates to a task execution device which allocates execution time to tasks to be executed in a Central Processing Unit (CPU), in other words, relates to an Operating System (OS).

(2) Description of the Related Art

The main functions of the OS are "hardware management", "task management", "data management" and "input/output management". Above all, "task management" refers to the management of the task execution sequence, and is an important function for making a CPU, a memory, an input/output device, and so on, operate effectively. Here, a "task" is a unit of control which manages a series of flows, such as the start-up, execution and completion of a program, as a batch. A program which operates under the OS's management is handled as a task. The tasks in every OS operation related to the execution of a program are performed as units.

The time-sharing scheduling method is well-known as an example of an algorithm which determines a task execution sequence. The time-sharing scheduling method is a task scheduling method which allocates an execution time for each task, applies the allocated times to tasks in the CPU which have execution permission, and when the times allocated for the tasks elapse, transfers execution permission to other tasks. By doing so, execution permission is assigned for every task by an equal and determined time.

There are methods for the determination of the allocated time such as a method of fixed allocation according to a task's properties, and a method of dynamic determination according to the task's execution conditions, and for instance, methods such as adjusting the allocated time for the execution permission, based on task priority, are well known (see for example, Japanese Laid-Open Patent Application No. 2005-18560 Publication).

However, in the case where a task is shifted to a waiting state when it must wait for an event, conventional OSs will transfer execution permission to a subsequent task, or execute no processes until the allocated time has expired for the task shifted to the waiting state. Also, in an execution environment where tasks which need a guarantee of process performance, and tasks for which processes are generated asynchronously, such as an event driven process, co-exist, asynchronous processes must be executed while continuously distributing process performance and maintaining the cycle for the entire process is maintained. As a result there are the problems that overhead occurs, and processing power drops due to the continuous adjustment and execution of the allocated time.

SUMMARY OF THE INVENTION

The present invention is conceived in order to achieve the objects above, and aims to provide a task execution device and method which can reduce a load accompanying the allocated adjustments for the allocated time of a task while preserving a fixed processing power.

In order to achieve the objects above, the task execution device in the present invention is a task execution device for executing a plurality of tasks while switching the tasks from one to another by time-sharing, wherein an allocated time is allocated for each of the plurality of tasks, and the plurality of tasks includes a plurality of first-type tasks and a single second-type task. The task execution device including: a cycle time storage unit which stores a cycle time, which is a total time of the allocated times for the plurality of tasks; a task selection unit which selects a task from among the plurality of tasks according to a predetermined sequence; a correction unit which, when the selected task is the second-type task, corrects an allocated time for the selected second-type task so that execution of the plurality of tasks completes within the cycle time; and a task execution control unit which causes the selected task to be executed so that execution of the task completes within one of the allocated time and the corrected allocated time.

According to this configuration, the tasks which are executed in the processor are divided into first-type tasks and a second-type task, and corrections to the allocated time are performed for only the second-type task, such that the plurality of tasks are executed within the cycle time. As a result, while a fixed processing power is preserved, a task scheduling device can be provided which can reduce the load accompanying the allocated adjustments for the task execution time. Note that corrections to the allocated time for the second type task do not have to be performed in the case where all of the first type tasks are shifted into a waiting state.

Preferably the allocated time for the second-type task is one of a first allocated time, which is the minimum time which must be executed for the execution time of the task, and a second allocated time, which is a sum of a predetermined margin time and the first allocated time, and the correction unit further includes: a total consumed time calculation unit which calculates a total consumed time consumed in the execution of the plurality of first-type tasks; and an allocated time correction unit which corrects the allocated time for the second-type by subtracting from the margin time a difference between the total consumed time and the total allocated time for the plurality of first-type tasks, and by adding the result of the subtraction to the first allocated time. More specifically, in the case where the difference between the total consumed time and the total allocated time for the second-type task is larger than the margin time, the allocated time correction unit which corrects the allocated time by adding a time, which is a result of subtracting the margin time from the difference between the total consumed time and the total allocated time, to the first allocated time for a second-type task to be executed in a subsequent cycle, so that a result of the addition does not exceed the cycle time where the cycle is an interval during which each of the plurality of tasks are executed once.

By assuming a configuration like this, the first allocated time is reserved for the second-type task and the second-type task can be reliably executed.

Preferably, the task execution device mentioned above further includes a power supply reduction unit which reduces supply of electric power to a processor in which the second-type task is executed, during the allocated time for the second type task, in the case where the second-type task is shifted into a waiting state. In addition, the task execution device mentioned above further includes a power supply stopping unit which stops supply of electric power to a processor in which the plurality of tasks is executed, in the case where all of the plurality of tasks is shifted into a waiting state.

The execution situation of each task is detected, and by changing the task to a state of providing power to the processor, the power that must be consumed for the execution of the task can be reduced.

Note that the present invention may be realized not only as the task execution device above but also as a task execution method which includes the characteristic units included in the task execution device as steps, and as an operating system for causing a computer to execute these steps. It goes without saying that this sort of program can be distributed through a recording medium such as a CD-ROM and a transmission medium such as the Internet.

According to the present invention, a task scheduling device can be provided which can reduce the load accompanying the allocated adjustments for the task execution time while preserving a fixed processing power.

FURTHER INFORMATION ABOUT TECHNICAL BACKGROUND TO THIS APPLICATION

The disclosure of Japanese Patent Application No. 2005-243417 filed on Aug. 24, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Overall Structure

Figure 1:
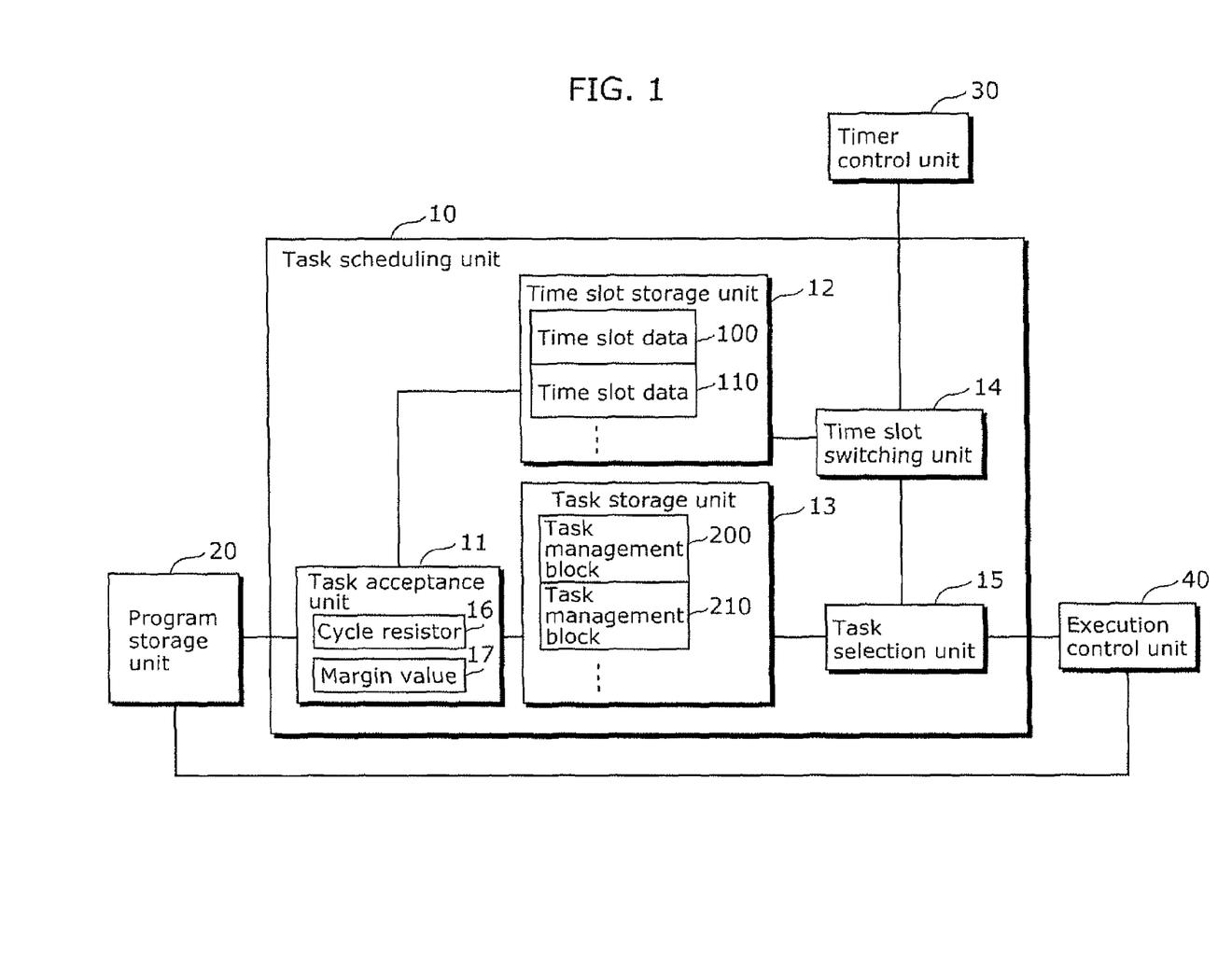
FIG. 1 is a block diagram which shows the structure of the principal part of a task execution device which switches time slots in the embodiment of the present invention.

FIG. 1 is a block diagram which shows a structure of the principal part of a task execution device which switches tasks in the embodiment of the present invention. In the figure is shown a typical functions realized by executing software which switches tasks as a function of a part of the OS in a processor. The hardware structure of the processor may be a standard structure.

The task execution device is configured to handle every plurality of tasks which have an "allocated time" designation in one processor, and to execute the program while maintaining the performance necessary for each task.

The task execution device is configured, as shown in the figure, from a task scheduling unit 10, a program storage unit 20, a timer control unit 30 and an execution control unit 40.

The task scheduling unit 10 allocates a time-slot to each task which has an "allocated time" designation and performs time division scheduling, which selects each task at least once within a cycle that has been designated in advance. Here, the "time slot" is a slot delimited by the program execution time in the processor for every allocated time within a cycle T, which has been predetermined.

The program storage unit 20 stores the program, which is a concatenation of tasks, and which is targeted for scheduling by the task scheduling unit 10, and also stores data related to the program.

The timer control unit 30 starts a time count for each allocated time set by the task scheduling unit 10, and outputs a time-out signal when the allocated time has been reached. This time-out signal notifies the task scheduling unit 10 of the timing for the time slot's switching.

The execution control unit 40 executes a task selected by the task scheduling unit 10. The execution control unit 40 corresponds to the hardware which executes the task, such as a CPU.

(Configuration of task scheduling unit 10)

The task scheduling unit 10 is configured from a task acceptance unit 11, a time slot storage unit 12, a task storage unit 13, a time slot switching unit 14 and a task selection unit 15.

<1. Task acceptance unit 11>

The task acceptance unit 11 accepts a task addition request according to an instruction from a user operation, a user program and so on, and reads out "task data" and "allocated time" from the program storage unit 20 as data related to the task. In addition, the task acceptance unit 11 generates a time slot data 100 (110) and a task management block 200 (210) from the task data and the allocated time so that the task is targeted for scheduling, and configures the time slot data 100 (110) and the task management block 200 (210) in the time slot storage unit 12 and the task storage unit 13, respectively.

Here, "task data" includes a "program start address" and a "stack pointer". The "program start address" is the initial address into which the task is written. The "stack pointer" is position data which shows the holding location, which temporarily saves the task state when task switching has occurred.

The tasks are assigned in one to one correspondence with a time slot by the task scheduling unit 10, and are executed securely within the allocated times of the time slot.

The tasks are classified into two types, according to their execution properties (type A and type B). Tasks which need a fixed process performance are included under "type A". Tasks which are called time-driven tasks should be included under type A. For example, it is preferable to include a task under type A which requires a constant process performance and maintains a decoding and encoding process for video data and a decoding and encoding process for audio.

On the other hand, tasks which do not need a constant process performance are included under "type B". Tasks which are called event-driven tasks should be included in type B. For example, tasks which maintain and do not need a constant process performance, but occur irregularly and occasionally, such as a process which carries out a menu display, of text and still images, displaying a user's operation as an event, are preferably included under type B.

The "allocated time" is a value which designates the allocated time for the time-slot which corresponds to the task. This allocated time is a time designated by the program.

Note that the total allocated time for the tasks executed in one cycle is held in a cycle resistor 16 as the cycle T.

<2. Time-slot storage unit 12>

The time-slot storage unit 12 stores time slot data for generating time slots, which serve as the basis for task switching.

Figure 2:
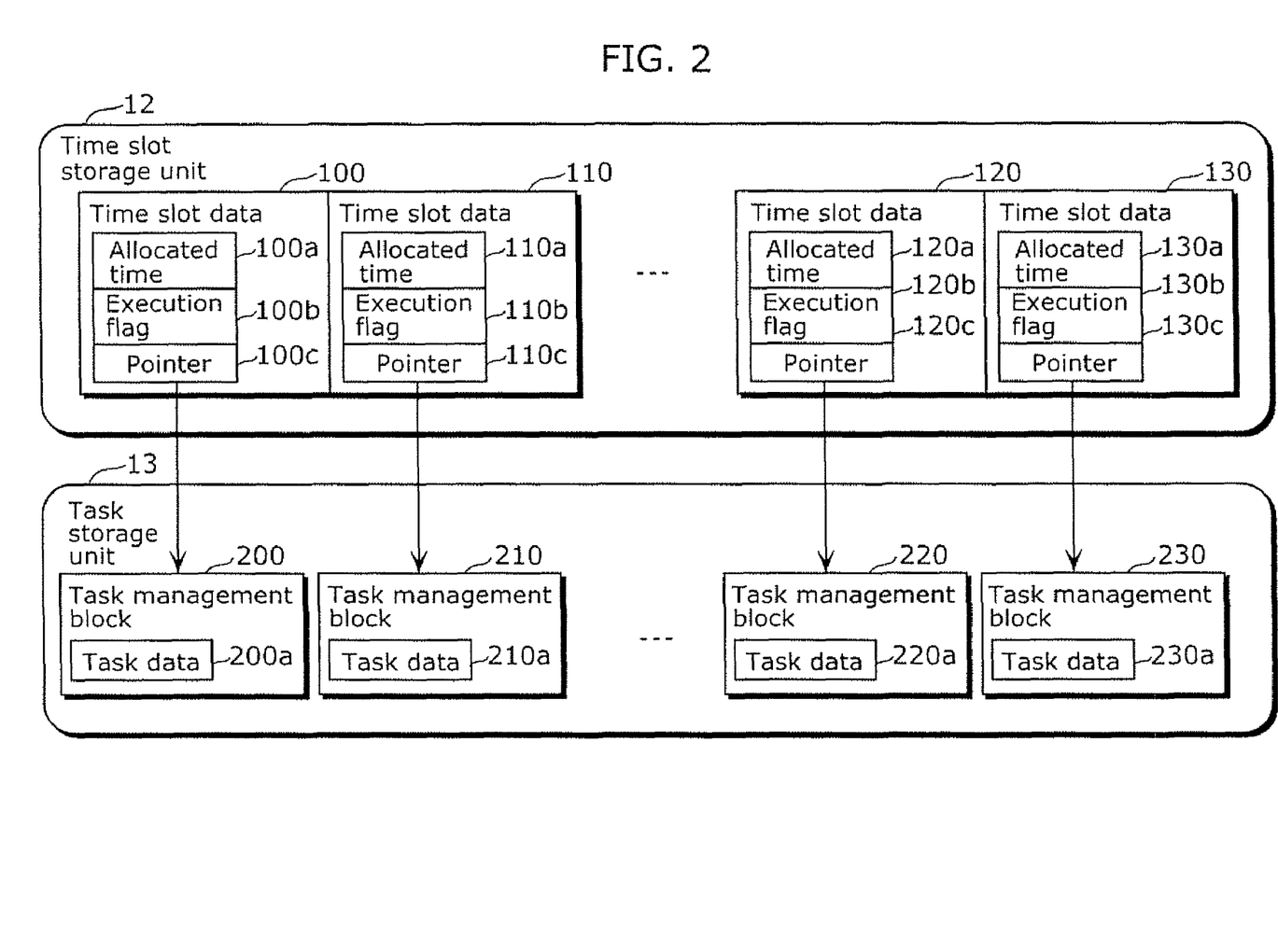
FIG. 2 is a diagram which shows specific examples of time slot data in a time slot storage unit, and task management blocks in a task storage unit.

FIG. 2 is a diagram which shows a specific example of time slot data in the time slot storage unit 12, and task management blocks in the task storage unit 13. As shown in the figure, the time slot storage unit 12 stores a plurality of time slot data 100, 110, . . . 120, 130. The time slot data from 100 to 120 indicate time slots to which type A tasks have been assigned. Additionally, the remaining time slot data 130 indicates a time slot to which a type B task has been assigned.

The time slot data 100 corresponds to one time slot and is made up of an allocated time 100a, an execution flag 100b and a pointer 100c; this is the same for other time slot data.

The allocated time 100a indicates a time in which a task corresponding to a time slot can be executed. When the time that the task has actually taken to execute reaches the allocated time, the task corresponding to the subsequent time slot is executed. The allocated times from 100a to 120a, which correspond to type A tasks, are set respectively by timer control unit 30, at the same time that the time slot data from 100 to 120 are generated. The allocated time 130a, which corresponds to a plurality of type B tasks is assumed to be the remaining time after subtracting the total of the allocated times for the other time slots from 100a to 120a from a time T of one cycle, held in the cycle resistor 16. This remaining time is a value that changes according to the task scheduling. Note that the calculation method for the allocated time 130a is an example, and other calculation methods are elaborated below.

The "execution flag" indicates whether the time slot is valid or invalid. The execution flag is set as valid when the time slot data is generated, is set as invalid when the resources of the access destination enter a locked state during the execution of the task and the task has entered a waiting state; afterwards, the execution flag is set as valid when the task returns from the waiting state to the execution permitted state. When the execution flag indicates that it is invalid, the time slot data from the time slot switching unit 14 regards the execution flag as not existing.

The "pointer" indicates a task management block which corresponds to the time slot. These time slot data 100, 110, 120, 130 compose an array, and the sequence of this array expresses the generation sequence for the time slots.

<3. Task storage unit 13>

The task storage unit 13 stores the task management blocks 200, 210, ..., 220 and 230, which correspond to the tasks assigned to the time slots. The task management blocks 200, 210, ..., 220 and 230 correspond to each task respectively, and are data for managing the tasks.

The task management block 200 is made with the task data 200a. The task data 200a includes a program start address (or an address at which execute of a program resumes) and a stack pointer. When the task management block 200 is generated, the task data 200a is the task data itself inputted by the task acceptance unit 11. When switching tasks, the task data 200a indicates the execution address and the value of the stack pointer at the point in time at which a task has been interrupted.

<4. Time slot switching unit 14>

The time slot switching unit 14 performs time slot switching when the execution time for a task in the present time slot has reached the allocated time. The timer control unit 30 notifies the time slot switching unit 14, by a time-out signal, whether or not the allocated time has been reached. The time slot switching unit 14 which has received the notification selects the subsequent time slot data.

In the present embodiment, the subsequent time slot data is selected according to the sequence of time slot data in the array. In other words, the time slot data is selected in the sequence of the time slot data 100, 110, ..., 120, 130, and after the last time slot data 130 is selected, it is assumed that the first time slot data 100 is re-selected.

The time slot switching unit 14 acquires the allocated time from the time slot data selected, and sets this in the timer control unit 30. By doing so, a time count for the allocated time for the subsequent time slot is started.

<5. Task selection unit 15>

The task selection unit 15 saves the execution address, the stack pointer and so on for the program that is currently being executed, as task data, into the task's task management block, when the time slot has been switched by the time slot switching unit 14, or when there has been an instruction from the program that is currently being executed. The task selection unit 15 extracts task data from the task management block of the task which must be executed subsequently and outputs the task data to the execution control unit 40. Simultaneously, the task selection unit 15 saves the context (resistor data, and so on) of the task currently being executed and resets the context of the task which must be executed subsequently. By doing so, the task which must be executed subsequently enters an execution state.

Figure 3:
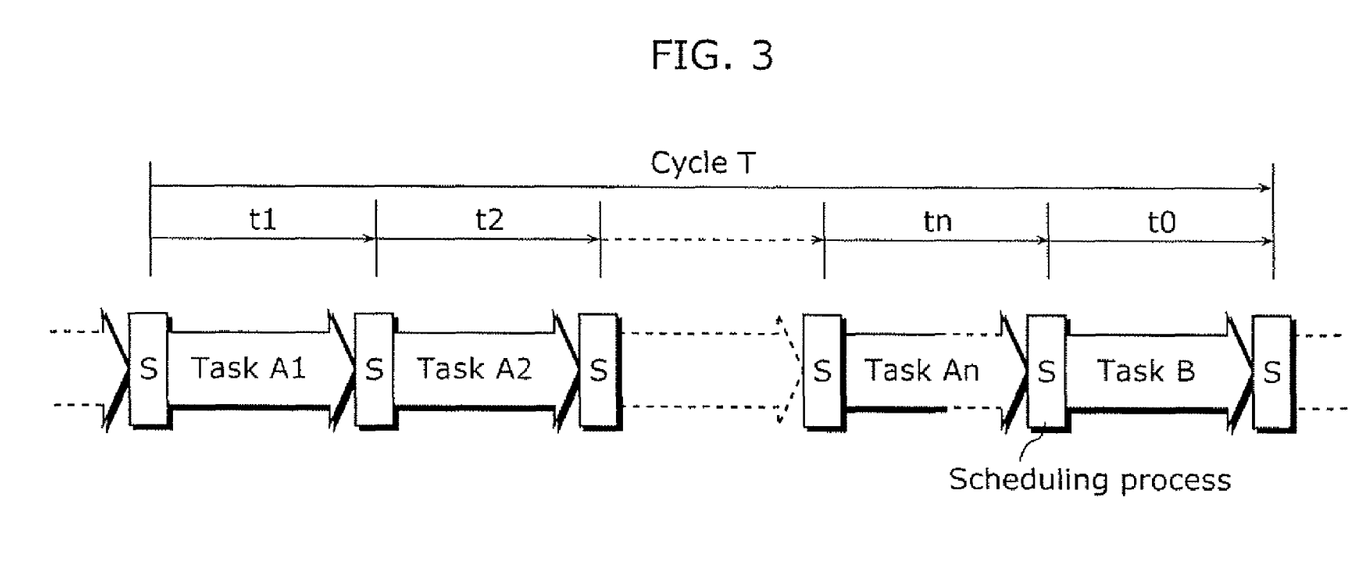
FIG. 3 is a diagram which describes the manner of task switching performed by a time slot switching unit and a task selection unit.

FIG. 3 is an explanatory diagram which shows a description of the task switching performed by the time slot switching unit 14 and the task selection unit 15.

In the figure, the cycle T indicates a cycle that is held by the cycle resistor 16. The time slots from t1 to tn correspond to n time slot data 100, 110, ..., 120, which in turn correspond to n type A tasks, and the length (from t1 to tn) indicates the allocated time for n tasks respectively. Additionally, t0 is a time slot which corresponds to the time slot data 130, which in turn corresponds to a type B task, and the length (t0) indicates the type B task's allocated time.

S indicates the scheduling process in which task switching is performed by the time slot switching unit 14 and the task selection unit 15.

In the figure, the type A task A1 which corresponds to the time slot data 100 is selected and executed in the scheduling process S when the time slot t1 is started. Type A tasks are executed in the same way for any of the time slots from t2 to tn. Also, a type B task is selected and executed in the scheduling process S for the final time slot t0. In this way, each task will definitely be executed at least once within one cycle T. In addition, a type B task B will be executed only once within one cycle T.

Details of the Process

Below, the scheduling process executed by the task execution device in the present embodiment is described.

<1. Scheduling process>

Figure 4:
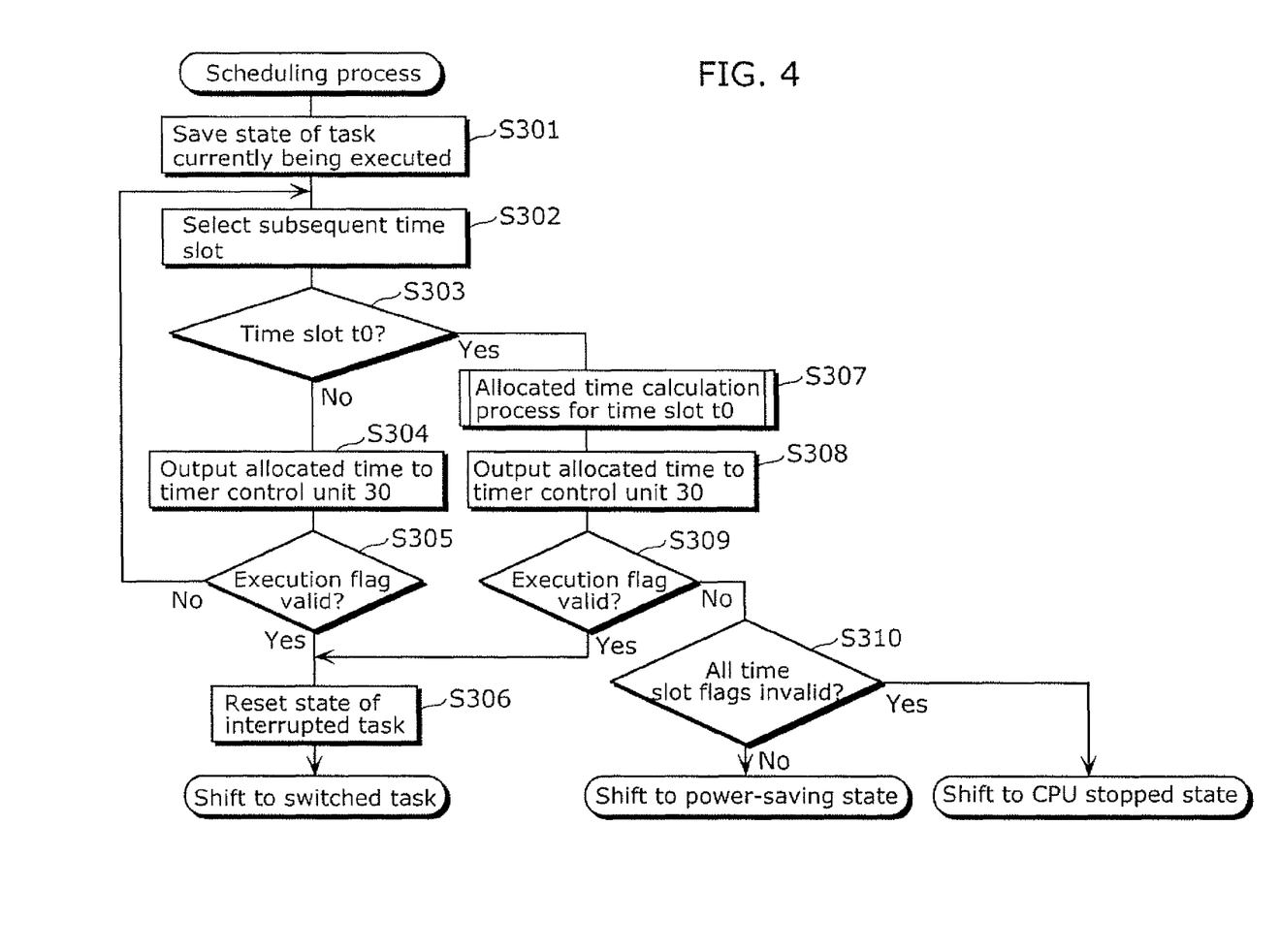
FIG. 4 is a flowchart of the scheduling process performed by a task scheduling unit.

The scheduling process is described based on the flowchart in FIG. 4. When the time set by the timer control unit 30 elapses, a time-out signal is transmitted to the time slot switching unit 14 and the scheduling process starts. First, the task state currently being executed is saved in the task data (S301). Next, the time slot switching unit 14 performs a time slot selection process (S302). In other words, the content following the content currently selected in the time slot data array becomes the time slot data to be subsequently selected. In the case where there is not a subsequent content, the initial content in the time slot data array is selected. In other words, the time slot switching unit 14 performs selection sequentially from the time slot data 100 of the time slot t1 to the time slot data 130 of the time slot t0, and afterwards performs selection again sequentially, starting from the time slot data 100 of the time slot t1.

The handling of the allocated time and the operations differ when the task in the time slot is invalid, or in a waiting state, according to whether or not the time slot t0 be subsequently selected is the time slot t0 (S303).

In the case where a time slot other than the time slot t0 has been selected (No in S303), the time slot switching unit 14 extracts the allocated time included in the time slot data of the selected time slot and outputs this allocated time to the timer control unit 30 (S304). After a time has elapsed from this point in time equal to the allocated time, a time-out signal is transmitted again from the timer control unit 30.

When an execution flag, held by the time slot data of the selected time slot, is invalid (No in S305), this indicates that there is no task to be executed, or the task is in a waiting state. As a result, the time slot switching unit 14 switches the time slot to the subsequent time slot and performs the same process until a valid time slot is found.

If there is a valid time slot (Yes in S305), the task selection unit 15 resets the state of the interrupted task corresponding to the time slot, and the execution control unit 40 resumes the execution of the task (S306).

When the time slot switching unit 14 selects the time slot t0 (Yes in S303), the time slot switching unit 14 begins by calculating the allocated time for the time slot t0 (S307). Since the process covers a broad spectrum, the details are described afterward. The time slot switching unit 14 outputs the allocated time calculated in the process to the timer control unit 30 (S308).

When the execution flag held by the time slot is valid (Yes in S309), in the same way as above when the time slot selected is a time slot other than t0, the task selection unit 15 resets the state of the interrupted task corresponding to the time slot t0, and the execution control unit 40 resumes the task (S306).

When the execution flag held by the time slot is invalid (No in S309), the time slot switching unit 14 checks to see whether all of the execution flags in the time slots other than the time slot t0 are invalid (S310). When all of the execution flags are invalid (Yes in S310), the task selection unit 15 shifts the CPU into a stopped state since there is not a valid execution process for every task in the time slot. In order to perform a reset from the stopped state, an outside signal such as an interrupt is used.

If there is even one valid time slot (No in S310), the CPU is made to operate, however since there is no need to make the CPU operate during the allocated time for the time slot t0, the CPU is shifted into a power-saving state.

<2. Process for calculating the allocated time for the time slot t0>

Figure 5:
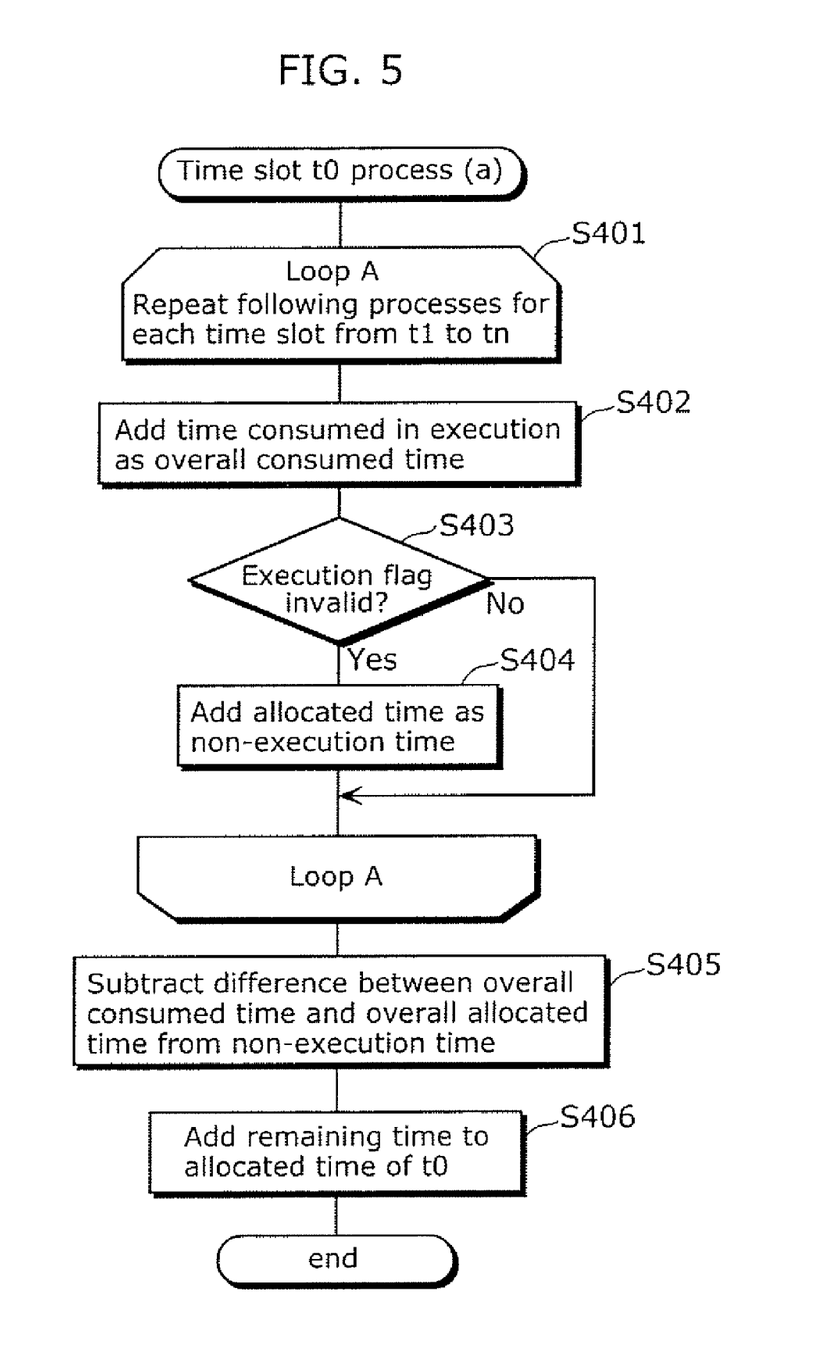
FIG. 5 is a flowchart of the process for calculating the allocated time by the task scheduling unit to time slots for event driven tasks.
Figure 6:
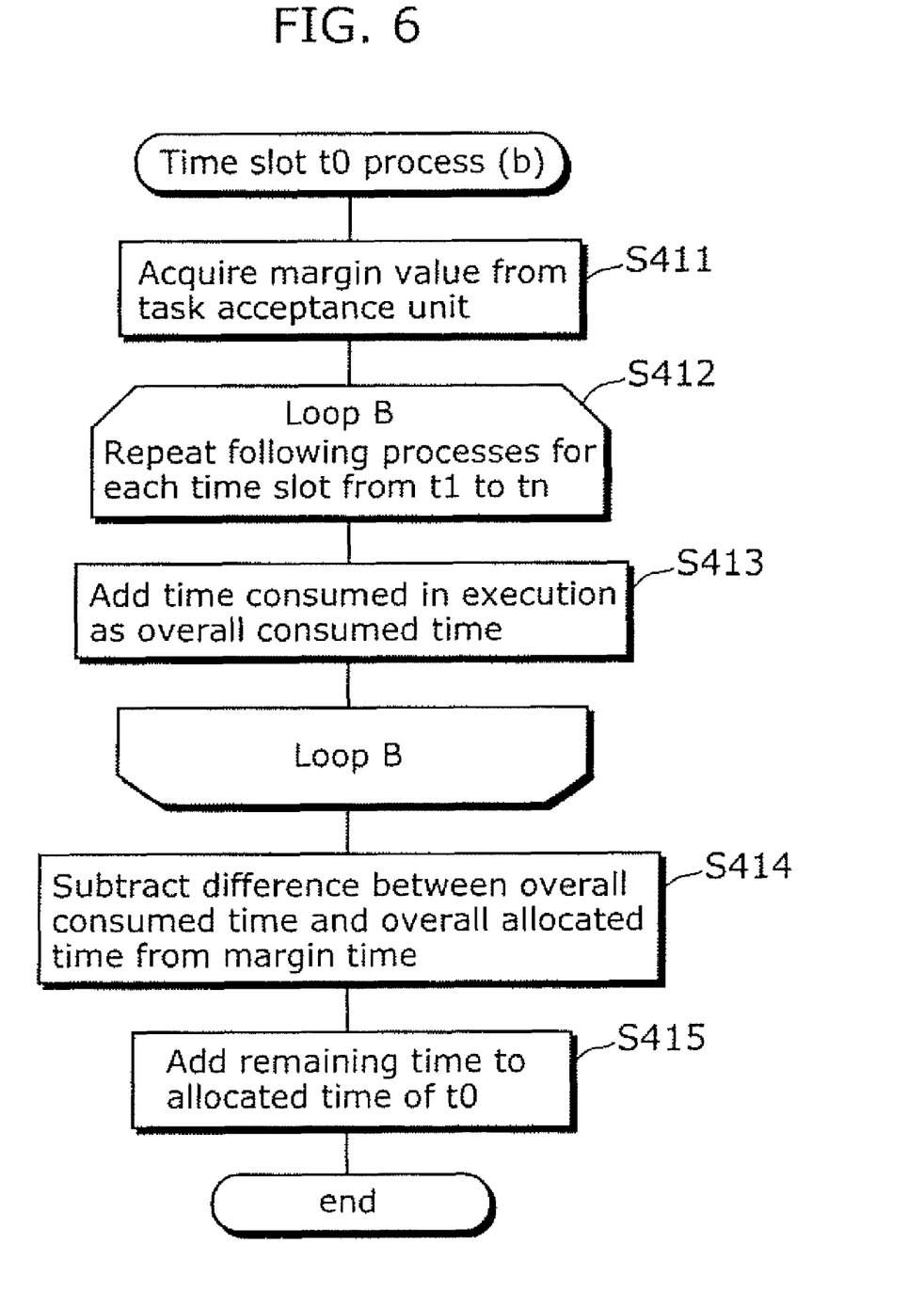
FIG. 6 is a flowchart of the process for calculating the allocated time for the time slots for event driven tasks by the task scheduling unit.

Next, the process for calculating the allocated time for the time slot t0 (S307 in FIG. 4) is described based on the flowcharts in FIG. 5 and FIG. 6. There are three variations to the process which are described respectively.

(a) Case where the allocated time for a time slot in the waiting state is allocated for the time slot t0

As shown in FIG. 5, the total time consumed in the execution of tasks in a previous cycle (total time consumed) and the total allocated time for the time slots with invalid execution flags (non-execution time) are calculated for the time slots from the time slot t1 to tn (from S401 to S404).

When the total consumed time is larger than the total allocated time for the time slots from t1 to tn, the influence of an external cause such as an interruption is interpreted to be the cause. Because of this, the result of (total consumed time—total allocated time) is subtracted from the total allocated time for the time slots with invalid execution flags, i.e. from the non-execution time. In other words, the result of (total consumed time—total allocated time), which is the time exceeded on account of an external cause, is subtracted from the time in which the task assigned for the time slot is not being executed (non-execution time).

Adding the allocated time for the time slot t0 to this value gives the allocated time for the time slot t0 after calculation (S406).

Note that even if the total consumed time is smaller than the total allocated time, the allocated time for the time slot t0 can be calculated by using the same equation.

(b) Case where the margin time is set, and from it is decremented the portion of consumed time exceeding the allocated time As shown in FIG. 6, a margin value 17 is set in advance by the task acceptance unit 11 and the value is acquired from the acceptance unit 11 (S411). The margin value 17 is a margin time (margin time) M, allocated to the allocated time for the time slot t0. In other words, there are assumed to be two stages for the allocated time for the time slot t0, t0 and (t0+M).

First, the total for the time consumed in execution for a previous cycle (total consumed time) is calculated for the time slots from t1 to tn (S412, S413).

Next, when the total consumed time is more than the total allocated time, the result of (total consumed time—total allocated time) is subtracted from the margin time M (S414). Here, the total allocated time refers to the total allocated time for the time slots from t1 to tn.

The time result after adding the allocated time for the time slot t0 to the value after subtraction gives the allocated time after calculation for the time slot t0 (S415).

Note that when the margin M<the result of (total consumed time−total allocated time), in other words, when the value sought at S414 is negative, the margin time M is set to 0 and the result of ((total consumed time−total allocated time)−the margin M) is time-adjusted for execution in the time slot t0 of the subsequent cycle. This way, the tasks can be executed while keeping the allocated time for the time slot t0 in this cycle T.

(c) Instead of the margin value, the value given by acquiring a cycle 15 from the task acceptance unit 11, and subtracting the total consumed time from the cycle T (the total allocated time), may be set as the allocated time for the time slot t0 after calculation.

As described above, according to the task execution device in the present embodiment, performance can be retained by calculating and setting only the allocated time for a particular time slot, without re-calculating the allocated time for another time slot. As a result, it becomes possible to reduce the overhead necessary for re-setting the allocated time in the case where the situation has changed.

Also, by detecting the execution situation of the time slot and changing the CPU state, the present invention can contribute to reducing electricity consumption related to program execution.

Note that in the above embodiment, the case was described where one allocated time was designated for every task data as a fixed value for the time slots with type A tasks, however the task execution device may be realized as a configuration in which the task execution device retains two fixed values which indicate the largest and smallest values of the allocated times for every time slot, takes the total of the largest values of the allocated times for all of the time slots as a cycle, and operates while each time slot selects one of the allocated times according to the execution situation.

In addition, in the case where it is detected that the smallest value is selected in each time slot, the process will conclude in a short amount of time. Because of this, the operation frequency of the CPU may be lowered in order to execute a task within a range before one cycle's worth of process concludes in the set cycle T. As a result, it is possible to further contribute to a reduction in electricity consumption necessary for the execution of the task. Note that it is determined on a program, whether the largest values or the smallest values of the allocated times are used.

INDUSTRIAL APPLICABILITY

The task execution device in the present invention has (a) function(s) for adjusting all of the allocated time by time allocation which does not depend on process performance, while performing a fixed time allocation which ensures process performance. Because of this, it is possible to reduce the process load in allocated time adjustment for processes which ensure process performance; for example image reproduction processes can be carried out without being affected by noise or disturbance of image output caused by access from outside. In particular, the present invention can be applied as a device which performs audio/visual processes and non-synchronous control processes in real-time, as well as a development environment for such a device.

What is claimed is:

1. A task execution device, including a processor, for executing a plurality of tasks while switching the tasks from one to another by time-sharing,
    wherein an allocated time is allocated for each of the plurality of tasks,
    the plurality of tasks includes a plurality of first tasks and a single second task, and
    said task execution device comprises:
    a cycle time storage configured to store a cycle time, which is a total of the allocated times for the plurality of tasks;
    a task selector, embodied by the processor, configured to select a task from the plurality of tasks according to a predetermined sequence, in which the second task follows the plurality of first tasks;
    a corrector, embodied by the processor, and configured to, in each cycle, when the selected task is the second task, calculate a corrected allocated time for the second task, in accordance with whether the plurality of first tasks preceding the second task have entered an execution state, so that execution of the plurality of tasks is completed within the cycle time; and
    a task execution controller, embodied by the processor, configured to cause the selected task to be executed so that execution of the selected task is completed within one of the allocated time and the corrected allocated time.

2. The task execution device according to claim 1,
    wherein said corrector is configured to calculate the corrected allocated time for the second task by adding a non-execution time to the allocated time for the second task, the non-execution time being a total time of the plurality of first tasks which did not enter the execution state.

3. The task execution device according to claim 2,
    wherein said corrector includes:
    a total consumed time calculator configured to calculate a total consumed time, which is time consumed in the execution of the plurality of first tasks;
    a non-execution time calculator configured to calculate the non-execution time; and
    an allocated time corrector configured to calculate the corrected allocated time for the second task by subtracting from the non-execution time a difference between the total consumed time and a total allocated time for the plurality of first tasks, and by adding a result of the subtraction to the allocated time for the second task.

4. The task execution device according to claim 1,
    wherein said corrector is configured to set a difference between the cycle time and a total consumed time as the allocated time for the second task, the total consumed time being time consumed in the execution of the plurality of first tasks.

5. The task execution device according to claim 1,
    wherein the allocated time for the second task comprises a minimum time which must be provided for the execution of the second task, and a predetermined margin time, and said corrector further includes:
    a total consumed time calculator configured to calculate a total consumed time, which is time consumed in the execution of the plurality of first tasks; and
    an allocated time corrector configured to calculate the corrected allocated time for the second task by subtracting from the predetermined margin time a difference between the total consumed time and a total allocated time for the plurality of first tasks, and by adding the result of the subtraction to the minimum time.

6. The task execution device according to claim 5,
    wherein when the difference between the total consumed time and the total allocated time is larger than the predetermined margin time, said allocated time corrector is configured to calculate the corrected allocated time for the second task by adding a time, which is a result of subtracting the predetermined margin time from the difference between the total consumed time and the total allocated time, to the minimum time for a second task to be executed in a subsequent cycle, so that a result of the addition does not exceed the cycle time where the cycle is an interval during which each of the plurality of tasks are executed once.

7. The task execution device according to claim 1, further comprising,
    a power supply reducer configured to reduce a supply of electric power to a processor in which the second task is executed, during the allocated time for the second task, when the second task is shifted into a waiting state.

8. The task execution device according to claim 1, further comprising,
    a power supply stopper configured to stop supply of electric power to a processor in which the plurality of tasks is executed, when all of the plurality of tasks are shifted into a waiting state.

9. The task execution device according to claim 1,
    wherein a maximum value and a minimum value are set in the allocated time for each of the plurality of tasks,
    the cycle time stored in said cycle time storage is a total of the maximum values of the allocated times for the plurality of tasks, and
    said task execution controller is configured to control execution of the selected task such that each of the plurality of first tasks completes execution within one of the maximum value and the minimum value of the allocated time for each of the plurality of first tasks.

10. The task execution device according to claim 9,
    wherein said task execution controller is configured to lower an operation frequency of a processor in which each of the plurality of first tasks is executed, when the execution of the selected task is performed such that each of the plurality of first tasks completes execution within the minimum value of the allocated time for each of the plurality of first tasks.

11. A task execution method for executing a plurality of tasks while switching the tasks from one to another by time-sharing,
    wherein an allocated time is allocated for each of the plurality of tasks, the plurality of tasks includes a plurality of first tasks and a single second task, and a total of the allocated times for the plurality of tasks is a cycle time, the task execution method comprising:

selecting a task, from among the plurality of tasks, according to a predetermined sequence, in which the second task follows the plurality of first tasks;

calculating, in each cycle, when the selected task is the second task, a corrected allocated time for the second task, in accordance with whether the plurality of the first tasks preceding the second task have entered an execution state, so that the execution of the plurality of tasks is completed within the cycle time; and causing the selected task to be executed so that execution of the selected task is completed within one of the allocated time and the corrected allocated time.

12. A non-transitory tangible computer readable recording medium containing an operating system for executing a plurality of tasks while switching the tasks from one to another by time-sharing, wherein an allocated time is allocated for each of the plurality of tasks, the plurality of tasks includes a plurality of first tasks and a single second task, and a total of the allocated times for the plurality of tasks is a cycle time, the operating system causing a computer to execute:

selecting a task, from among the plurality of tasks, according to a predetermined sequence, in which the second task follows the plurality of first tasks;

calculating, in each cycle, when the selected task is the second task, a corrected allocated time for a selected second task, in accordance with whether the plurality of first tasks preceding the second task have entered an execution state, so that the execution of the plurality of tasks is completed within the cycle time; and causing the selected task to be executed so that execution of the selected task is completed within one of the allocated time and the corrected allocated time.

13. The task execution method according to claim 11, wherein the corrected allocated time for the second task is calculated by adding a non-execution time to the allocated time for the second task, the non-execution time being a total time of the plurality of first tasks which did not enter the execution state.

14. The task execution method according to claim 13, wherein the calculating includes:

calculating a total consumed time, which is time consumed in the execution of the plurality of first tasks;

calculating the non-execution time; and calculating the corrected allocated time for the second task by subtracting from the non-execution time a difference between the total consumed time and a total allocated time for the plurality of first tasks, and by adding a result of the subtraction to the allocated time for the second task.

15. The task execution method according to claim 11, wherein the calculating sets a difference between the cycle time and a total consumed time as the allocated time for the second task, the total consumed time being time consumed in the execution of the plurality of first tasks.

16. The task execution method according to claim 11, wherein the allocated time for the second task comprises a minimum time which must be provided for the execution of the second task, and a predetermined margin time, and the calculating includes:

calculating a total consumed time, which is time consumed in the execution of the plurality of first tasks; and calculating the corrected allocated time for the second task by subtracting from the predetermined margin time a difference between the total consumed time and a total allocated time for the plurality of first tasks, and by adding the result of the subtraction to the minimum time.

17. The task execution method according to claim 16, wherein when the difference between the total consumed time and the total allocated time is larger than the predetermined margin time, the corrected allocated time for the second task is calculated by adding a time, which is a result of subtracting the predetermined margin time from the difference between the total consumed time and the total allocated time, to the minimum time for a second task to be executed in a subsequent cycle, so that a result of the addition does not exceed the cycle time where the cycle is an interval during which each of the plurality of tasks are executed once.

18. The task execution method according to claim 11, further comprising:

reducing a supply of electric power to a processor in which the second task is executed, during the allocated time for the second task, when the second task is shifted into a waiting state.

19. The task execution method according to claim 11, further comprising:

stopping a supply of electric power to a processor in which the plurality of tasks is executed, when all of the plurality of tasks are shifted into a waiting state.

20. The task execution method according to claim 11, wherein a maximum value and a minimum value are set in the allocated time for each of the plurality of tasks, the cycle time is a total of the maximum values of the allocated times for the plurality of tasks, and execution of the selected task is controlled such that each of the plurality of first tasks completes execution within one of the maximum value and the minimum value of the allocated time for each of the plurality of first tasks.

* * * * *